United States Patent [19]

Vanderzyden et al.

[11] Patent Number: 5,103,949
[45] Date of Patent: Apr. 14, 1992

[54] THERMAL DISCONNECT

[75] Inventors: Henry R. Vanderzyden, Byron, Ill.; Gregory G. Johnson, San Diego, Calif.

[73] Assignee: Sundstrand Corporation, Rockford, Ill.

[21] Appl. No.: 610,536

[22] Filed: Nov. 8, 1990

[51] Int. Cl.⁵ .................... F16D 11/10; F16D 43/25
[52] U.S. Cl. .................... 192/24; 192/82 T; 192/101
[58] Field of Search ............... 192/24, 94, 101, 89 A, 192/82 T

[56] References Cited

U.S. PATENT DOCUMENTS

| | | | |
|---|---|---|---|
| 1,571,182 | 2/1926 | Barnum et al. | 335/141 |
| 2,127,319 | 8/1938 | Zahradnik | 337/148 |
| 2,509,813 | 5/1950 | Dineen | 192/101 |
| 2,642,970 | 6/1953 | Szekely | 192/24 |
| 3,001,620 | 9/1961 | Olchawa et al. | 192/24 |
| 3,212,613 | 10/1965 | Carlson | 192/101 |
| 3,220,218 | 11/1965 | Rio et al. | 192/101 X |
| 3,889,789 | 6/1975 | Boehringer | 192/82 T |
| 4,016,722 | 4/1977 | Niederer, Sr. | 60/531 |
| 4,042,088 | 8/1977 | Schmohe | 192/89 A X |
| 4,086,991 | 5/1978 | Swadley | 192/82 T |
| 4,244,455 | 1/1981 | Loker | 192/24 |
| 4,253,304 | 5/1981 | Lamb et al. | 60/527 |
| 4,269,293 | 5/1981 | Martin | 192/94 X |
| 4,271,947 | 6/1981 | Gaeckle | 192/82 T |
| 4,288,770 | 9/1981 | Gillette | 335/173 |
| 4,434,881 | 3/1984 | Denk et al. | 192/89 A |
| 4,537,578 | 8/1985 | Sharpe et al. | 192/82 T X |
| 4,934,977 | 6/1990 | Falconer et al. | 192/82 T X |
| 4,989,707 | 2/1991 | Doty et al. | 192/94 X |

FOREIGN PATENT DOCUMENTS 2036202 6/1980 United Kingdom.

OTHER PUBLICATIONS

Johnson, et al., U.S. patent application Ser. No. 07/439,783, filed Nov. 7, 1989, entitled "Thermal Operator for Use in a Mechanical Disconnect or the Like".

Primary Examiner—Richard Lorence
Attorney, Agent, or Firm—Marshall, O'Toole, Gerstein, Murray & Bicknell

[57] ABSTRACT

Inoperability due to solenoid freeze-up, electrical malfunction or human error in a mechanical disconnect system for disconnecting first and second shafts includes a disconnect plunger, a first spring for urging the disconnect plunger toward the first shaft whereby the disconnect plunger causes the first shaft to disengage the second shaft when the disconnect plunger is in contact with the first shaft, a solenoid having an armature and windings and a solenoid plunger coupled to the solenoid armature. A second spring urges the solenoid plunger into engagement with the disconnect plunger to thereby prevent movement of the disconnect plunger into engagement with the first shaft. The solenoid windings are controllably energized to move the solenoid armature such that the solenoid plunger is retracted from the disconnect plunger. An expandable material is disposed in a confined volume of space between the disconnect plunger and the solenoid whereby the expandable material expands when heated to a certain temperature to in turn move the solenoid plunger, solenoid armature and solenoid windings away from the disconnect plunger and thereby cause the disconnect plunger to contact the first shaft under the influence of the first spring.

20 Claims, 6 Drawing Sheets

THERMAL DISCONNECT

FIELD OF THE INVENTION

The present invention relates generally to disconnect devices, and more particularly to a device for disconnecting driving and driven shafts in the event of a fault.

BACKGROUND ART

During the operation of electromechanical systems, such as an integrated drive generator (IDG) comprising a hydromechanical constant speed drive and a generator packaged as an integral unit, excessive heat can build up within the system that can result in costly damage or destruction of system components. In such systems, it is therefore advantageous to include a disconnect device for discontinuing operation of the system as soon as an overtemperature condition is encountered. Usually, this is accomplished by interrupting the flow of motive power by disconnecting a gear box output shaft from an input worm shaft of the IDG. Typically, an IDG contains an electrical actuator in the form of a solenoid which may be actuated to disconnect the shafts when circumstances require that the system be stopped.

In those systems that rely upon an electromechanical actuator to effect the desired mechanical movement that allows disconnection, there is always the problem that corrosion or the like may prevent the actuator from responding to a proper signal and, of course, it is always possible that a fault in the electrical circuit could prevent the disconnect signal from being generated and provided to the actuator in the first place.

Further, it has been found that, in the event of over heating, an electrical disconnect device may be rendered inoperable due to the melting of wires or other electrical components. Therefore, it is desirable to have a disconnect device in which automatic mechanical actuation is thermally triggered. Furthermore, it is desirable to provide such a thermal disconnect device while still maintaining the operability of the electrical solenoid.

It is highly undesirable that a disconnection should occur inadvertently since, at the very least, that would result in an undesired shut down of the system and the need to reset same. It is just as important that the system be fail-safe, that is, that there be provided some measure of redundancy or other means that prevents the disconnect system from being rendered inoperative for any of a variety of reasons.

In those instances utilizing thermally responsive material for effecting the mechanical movement, some difficulties may be encountered in terms of causing inadvertent disconnects as a result of unrestrained thermal growth as the temperature of the mechanism rises, although not to the danger point.

Still other approaches using eutectic material frequently require substantial clean up before the mechanism can be reset and used again. In some instances eutectic material may enter machined parts of the mechanism, thereby causing fouling and requiring substantial removal effort and/or replacement of parts.

Carlson, U.S. Pat. No. 3,212,613, assigned to the assignee of the present application, discloses a thermal disconnect device for an electromechanical system having a driving shaft, a driven shaft mechanically linked to the driving shaft by a splined connection and a thermally expandable material disposed in recesses in the driven shaft. When the temperature reaches a predetermined level, the thermally expandable material expands and exerts forces against a piston in turn disconnecting the splined connection between the shafts. For purposes of protecting the components of the electromechanical system, the temperature at which the material expands is selected to be lower than a temperature which would cause damage to the system should it continue to operate.

Swadley, U.S. Pat. No. 4,086,991, also assigned to the assignee of the present invention, discloses a thermally actuated disconnect coupling for driving and driven members interconnected by a coupling shaft having a splined connection. Within the driven member, a fusible element such as an eutectic pellet supports the coupling shaft against axial movement away from the driving shaft. When the temperature in the vicinity of the pellet reaches a predetermined level, the pellet melts, in turn permitting the coupling shaft to move away from the driving member so as to disconnect the driving and the driven members.

Dineen, U.S. Pat. No. 2,509,813 discloses an emergency disconnect device for driving and driven members interconnected by a splined coupling shaft. The splined coupling shaft includes an externally threaded portion which engages a threaded nut. When the driving and driven shafts are to be disconnected, a pin is moved into engagement with an external projection of the nut to in turn arrest rotation thereof so that the splined coupling shaft is moved out of engagement with the driven shaft. In alternative embodiments, the projection on the nut is engaged by a spring loaded shaft which is normally prevented from engaging the nut by a fusible pin that resists the urging of the spring to move the pin into engagement with the projection on the nut. When the temperature in the vicinity of the fusible pin rises to a certain level, the fusible pin melts and permits the spring to urge the pin into engagement with the projection on the nut.

Gaeckle, U.S. Pat. No. 4,271,947 discloses a thermal disconnect device which mechanically disconnects two aligned shafts in response to overheating of a eutectic metallic element. Under usual operating conditions (i.e., when an overtemperature condition is not present) the eutectic element opposes the urging of a series of spring washers to force the aligned shafts out of engagement with one another. When an overtemperature condition is encountered, however, the eutectic element melts, thereby causing the shafts to move out of engagement with one another under the influence of the spring washers.

Other types of devices utilizing thermally responsive elements include Barnham, et al., U.S. Pat. No. 1,571,182, Zahradnik, U.S. Pat. 2,127,319, Niederer, Sr., U.S. Pat. No. 4,016,722, Lamb, et al., U.S. Pat. No. 4,253,304, Gillette, U.S. Pat. No. 4,288,770 and U.K. Patent Application 2,036,202.

Johnson, et al., U.S. patent application Ser. No. 07/439,783, filed Nov. 21, 1989, entitled "Thermal Operator for Use in a Mechanical Disconnect or the Like" and assigned to the assignee of the present application discloses a prior art thermal disconnect device which can be retrofitted to a conventional solenoid disconnect device. A disconnect plunger is urged toward a series of external threads carried by a worm shaft which is in turn coupled by a jaw tooth clutch to an input or driving shaft. The plunger is restrained against movement into engagement with the external threads by a solenoid plunger which is normally disposed in a hole in the disconnect plunger. The solenoid plunger can be retracted out of the hole in the disconnect plunger to thereby allow the disconnect plunger to engage the external threads and thereby axially move the worm shaft away from the input shaft. This may be accomplished by actuating the solenoid or may occur in response to an overtemperature condition. When such a condition is encountered, a eutectic wax expands and displaces a piston within a housing containing the solenoid plunger. The piston carries an axially directed finger that in turn bears against an armature of the solenoid. As the piston is displaced, the armature moves axially and thereby retracts the solenoid plunger from the hole in the disconnect plunger.

SUMMARY OF THE INVENTION

According to the present invention, a disconnect device is simple and reliable in operation.

More particularly, according to one aspect of the present invention, a device for moving a first shaft relative to a second shaft between an engaged position wherein the first and second shafts are engaged and rotate together and a disengaged position wherein the first shaft is disengaged from the second shaft includes a disconnect plunger, first means for urging the disconnect plunger toward the first shaft whereby the disconnect plunger causes the first shaft to move to the disengaged position when the disconnect plunger is in contact with the first shaft, a solenoid having an armature and windings and a solenoid plunger coupled to the solenoid armature. Second means are provided for urging the solenoid plunger into engagement with the disconnect plunger to thereby prevent movement of the disconnect plunger into engagement with the first shaft. Third means are further provided for controllably energizing the solenoid windings to move the solenoid armature such that the solenoid plunger is retracted from the disconnect plunger. An expandable material is disposed in a confined volume of space between the disconnect plunger and the solenoid whereby the expandable material expands when heated to a certain temperature to in turn move the solenoid plunger, solenoid armature and solenoid windings away from the disconnect plunger and thereby cause the disconnect plunger to contact the first shaft under the influence of the first urging means.

In accordance with a preferred embodiment of this aspect of the invention, the expandable material comprises a eutectic wax. Further, the first and second urging means comprise first and second springs, respectively. In addition, a cylindrical housing is provided within which the solenoid, the second spring and the expandable material are disposed, a base plate is disposed in the housing adjacent an end of the solenoid windings and a stop member is disposed in the housing and spaced from the base plate wherein a recess is formed between the base plate and the stop member and wherein the second spring is disposed in the recess.

Still further, a third spring is disposed in an additional recess within the housing between the base plate and the solenoid armature. A piston is disposed within the housing between the expandable material and the solenoid wherein the piston transmits forces developed during expansion of the expandable material to the solenoid armature and solenoid windings.

In accordance with a further aspect of the present invention, a device for moving a first shaft relative to a second shaft between an engaged position wherein the first and second shafts are engaged and rotate together and a disengaged position wherein the first shaft is disengaged from the second shaft includes a disconnect plunger, first means for urging the disconnect plunger toward the first shaft whereby the disconnect plunger causes the first shaft to move to the disengaged position when the disconnect plunger is in contact with the first shaft and a solenoid having a housing and a solenoid plunger extending outwardly from the housing wherein the solenoid is capable of assuming two states in which the solenoid plunger is disposed in different positions relative to the housing. Second means are disposed in contact with the solenoid housing for urging the solenoid plunger away from the disconnect plunger. Third means are effective at temperatures lower than a certain temperature for resisting the urging of the second means so that the solenoid plunger contacts the disconnect plunger when the solenoid assumes one of the states to thereby prevent movement of the disconnect plunger into engagement with the first shaft. The third means is effective at temperatures higher than the certain temperature to allow the solenoid plunger to move under the influence of the second urging means out of contact with the disconnect plunger whereby the disconnect plunger moves into engagement with the first shaft under the influence of the first urging means.

In accordance with one embodiment of this aspect of the present invention, the solenoid is disposed in a sleeve adjacent one end thereof and the third means comprises a mass of eutectic solder disposed in a recess of the sleeve adjacent the second end thereof opposite the first end. According to the preferred embodiment, the mass of eutectic solder is ring-shaped. Also preferably, the recess is defined by the housing, the solenoid and a retainer plate disposed adjacent the second end of the housing and the retainer plate prevents escape of solder from the recess. A retaining ring may be disposed between the second end of the sleeve and the retainer plate to maintain the retainer plate in position. Further in accordance with this embodiment of the present invention, the second means is disposed between a flange at the first end of the housing and the solenoid.

According to a highly preferred form of this embodiment of the present invention, the second means comprises a belleville washer.

In accordance with an alternative embodiment according to this aspect of the present invention, the solenoid is disposed within a cylindrical sleeve such that an annular space is formed between the solenoid and the sleeve and the third means comprises eutectic solder disposed in the annular space. According to a highly preferred form of this embodiment, the second means is disposed between a flange at the first end of the housing and the solenoid. Further, the second means preferably comprises a belleville washer in this embodiment. In addition, a retaining ring may be disposed in the sleeve between the solenoid and the second end of the sleeve for retaining the solenoid in the sleeve.

According to a still further embodiment of this aspect of the present invention, the second means comprises a first spring disposed within the housing between the solenoid plunger and a first end of the housing adjacent the disconnect plunger and the third means comprises a mass of eutectic solder disposed in the housing at a second end thereof opposite the first end. Further, a second spring is disposed in the housing between the mass of eutectic solder and the plunger. In accordance with this embodiment, the first and second springs exert opposing forces on the solenoid plunger at temperatures lower than the certain temperature to maintain the solenoid plunger in contact with the disconnect plunger. At temperatures higher than the certain temperature, the eutectic solder melts, thereby removing the support for the second spring and causing the solenoid plunger to move out of contact with the disconnect plunger under the influence of the first spring.

The disconnect device of the present invention is simple in design and reliably disconnects two shafts in the event of a fault condition.

DESCRIPTION OF THE PREFERRED EMBODIMENTS

Figure 1:
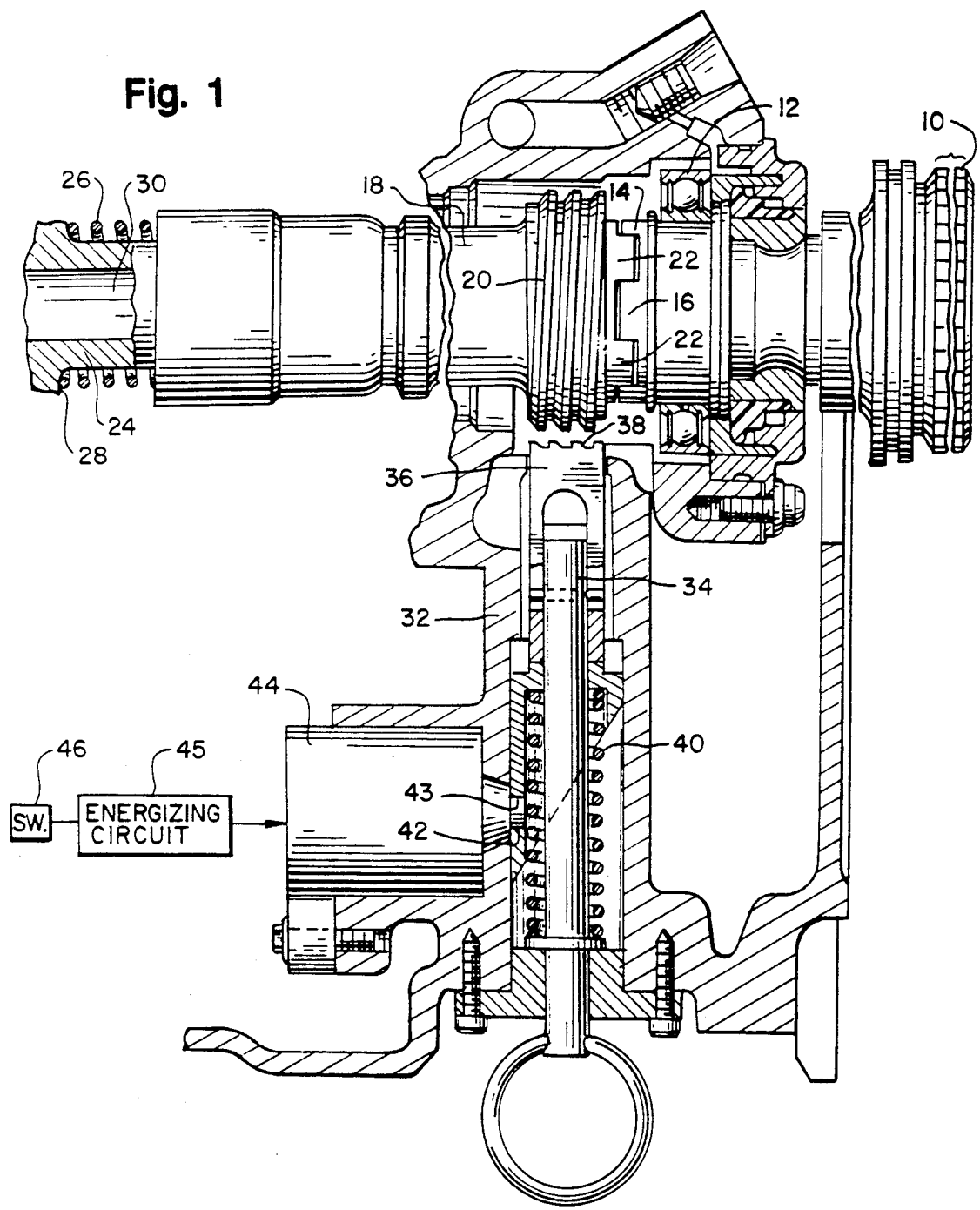
FIG. 1 comprises an elevational view, partly in section, of a mechanical disconnect mechanism which may incorporate the disconnect device of the present invention.

A typical prior art construction in which a disconnect device according to the invention may find utility is illustrated in FIG. 1 in the form of part of a conventional drive train between for example, the gear box associated with an aircraft turbine engine, and a constant speed drive of an integrated drive generator (IDG) forming part of the electrical system for such aircraft. However, it is to be understood that the present invention may be employed with efficacy in other environments as well and that no limitation in any particular environment is intended except insofar as stated in the claims.

With reference to FIG. 1, an input spline shaft 10 is shown and is connected to the gear box (not shown) of an aircraft turbine engine (also not shown). The input spline shaft 10 is journaled as by bearings 12 and at one end 14 includes axially facing teeth 16.

A so-called "worm shaft" 18 having an external threaded portion 20 is mounted in alignment with the input spline shaft 10 and has axially facing teeth 22 which may interengage with the teeth 16 to couple the shafts 10 and 18 together s that rotary input applied to the former will result in driving of the latter.

In the usual case, the worm shaft 18 is axially movable on a driven shaft 24 which serves as the input to the IDG while being splined thereto so that rotation of the shaft 18 will be conveyed to the shaft 24. A reset spring 26 is disposed between a shoulder 28 on the shaft 24 and an end 30 of the worm shaft 18 so as to bias the latter such that the teeth 22 engage with the teeth 16 on the input spline shaft.

The system includes a housing 32 which is partially shown in the Figures and within such housing is a disconnect plunger 34 which is mounted for reciprocal movement in the radial direction, that is, toward and away from the shafts 10 and 18. On its radial inner end, the plunger 34 includes a pawl 36 with a threaded surface 38 in alignment with the thread 20 on the worm shaft 18. A spring 40 operates against the plunger 34 so as to bias or urge same toward the shafts 10 and 18 while a solenoid pin or plunger 42 is normally disposed in an aperture 43 in the plunger 34 to latchingly engage the plunger 34 so that it is held in the position shown, that is, with the pawl 36 spaced from the external thread 20. The solenoid plunger 42 may be withdrawn by electrical operation of a disconnect device 44 according to the present invention in response to power applied by an energizing circuit 45 and when such occurs, the spring 40 drives the plunger 34 and the pawl 36 radially inward such that the threaded surface 38 engages the thread 20 on the worm shaft 18. The thread 20 is pitched such that continued rotation of the worm shaft 18 while engaged with the threaded surface 38 results in the worm shaft 18 axially moving to the left as viewed in FIG. 1 against the bias of the spring 26. As such occurs, the teeth 22 are disengaged from the teeth 16 and the driving connection between the shafts 10 and 18 is quickly broken to ultimately terminate the rotary input on the shaft 24 to the IDG.

In the usual case, the energizing circuit 45 is controlled by a manually-operable switch 46 that is accessible to a pilot of the aircraft or other member of the flight crew. Also, sensors are typically employed along with appropriate circuitry to indicate manual activation of the disconnect device 44 when it is determined that the coupling of further power to the mechanism connected to the shaft 24 could result in damage thereto.

Figure 2:
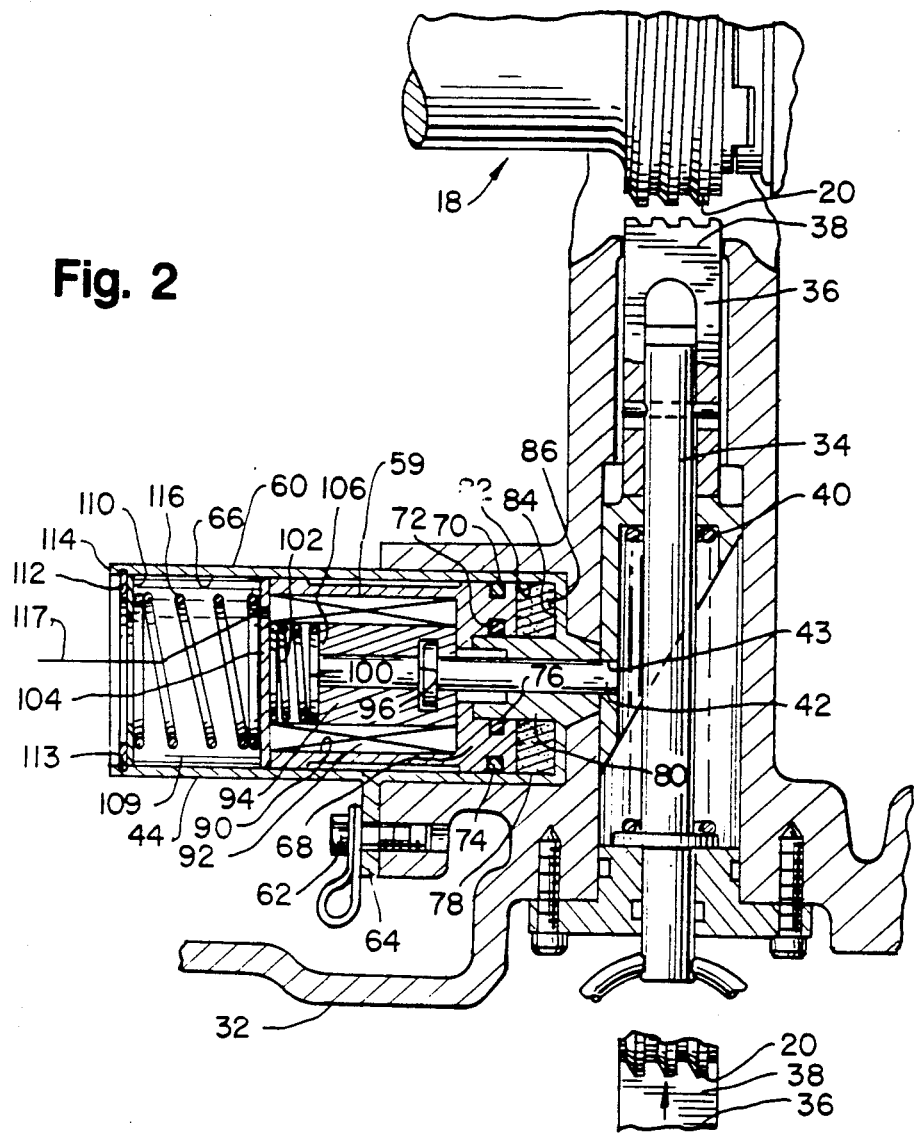
FIG. 2 comprises an elevational view, partly in section, of a first embodiment of the present invention before thermal activation thereof.
Figure 3:
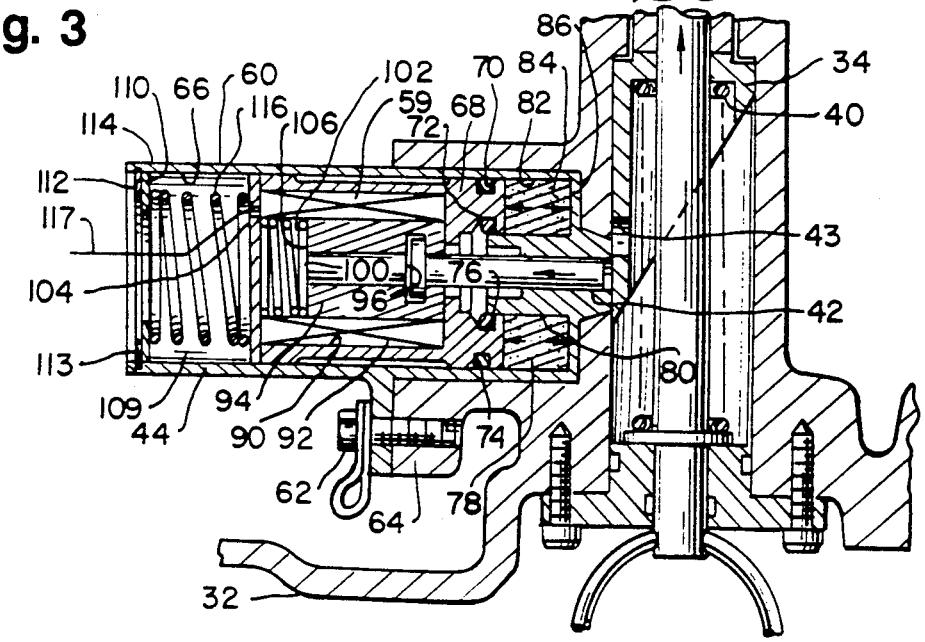
FIG. 3 is a view identical to FIG. 2 illustrating the present invention after thermal activation thereof.

Referring now to FIGS. 2 and 3, a first embodiment of the disconnect device 44 according to the present invention is illustrated. The device 44 includes a solenoid 59 disposed in a solenoid housing 60 which is secured by one or more bolts 62 that extend through a flange 64 of the housing 60 into the IDG housing 32. Disposed within the housing 60 is a chamber 66 which is generally cylindrical in shape.

A generally cylindrical piston 68 is slidingly received within the chamber 66 of the housing 60 and includes first and second circumferential recesses 70, 72. Seals 74, 76 are disposed within the recesses 70, 72 and provide sealing against radial outward and inner surfaces 78, 80, respectively. Disposed within a recess 82 between the piston 68 and end wall 84 of the housing 60 is a mass of eutectic material 86. Preferably, the material 86 comprises a eutectic wax that undergoes sudden, substantial volumetric increase in response to increasing temperature accompanied by a solid to liquid phase change. Preferably, in this embodiment, the eutectic material is any one of a number of conventional waxes as, for example, paraterphenyl. The piston 68 further includes a counterbore 90 within which is disposed a series of windings 92 of the solenoid 59. Also received within the counterbore 90 is a armature 94 of the solenoid 59. The armature 94 includes a T-shaped slot 96 that receives an enlarged head of the solenoid pin or plunger 42.

Urging means in the form of a helical spring 100 is captured in a recess 102 between a base plate 104 mounted within the housing 60 and an end 106 of the armature 94. The spring 100 urges the armature 94, and hence the solenoid plunger 42, to the right as viewed in FIG. 2 so that the solenoid plunger 42 extends into the hole 43 in the disconnect plunger 36 when the solenoid 59 is in the deactuated state. On the other hand, when the solenoid 59 is operated in the actuated state, electrical power is provided to the windings 92 by the energizing circuit 45, FIG. 1, to in turn cause retraction or movement of the armature 94, and hence the solenoid plunger 42, to the left as viewed in FIG. 2 so that the solenoid plunger 42 is moved out of the hole 43 in the disconnect plunger 36 This, in turn, releases the disconnect plunger 36 so that it can move under the influence of the spring 40 into engagement with the threads 20 on the worm shaft 18, as previously described.

A recess 109 is formed between the base plate 104 and a retaining ring 110 wherein the latter is held in place by a snap-ring 112 disposed in a circumferential groove 113 adjacent an end 114 of the housing 60. A spring 116 is disposed in the recess 109 and urges the base plate 104, and hence the windings 92, the armature 94, the solenoid plunger 42 and the piston 68 to the right as viewed in FIG. 2.

Solenoid wires 117 extend from the solenoid windings 92 through the spring 116 out of the housing 60 and are coupled to the energizing circuit 45 of the FIG. 1.

When the temperature in the vicinity of the disconnect device 44 is below the melting point of eutectic wax 86, and when the disconnect device 44 is deactuated, the various parts assume the positions generally shown in FIG. 2. However, as seen in FIG. 3, when the temperature in the vicinity of the disconnect device 44 rises above the melting point of the wax 86, the expanding wax 86 causes the piston 68 to move to the left, in turn causing the solenoid 59 comprising the windings 92 and the armature 94 to move to the left as well. The capturing of the enlarged head of the solenoid plunger 42 in the armature 94 in turn causes the solenoid plunger 42 to be retracted as well so that the end of the solenoid plunger 42 is withdrawn from the hole 43 in the disconnect plunger 34. Driving of the pawl 36 into engagement with the thread 20 thereafter occurs, in turn resulting in the above-described retraction of the worm shaft 18 from the shaft 10.

Figure 4:
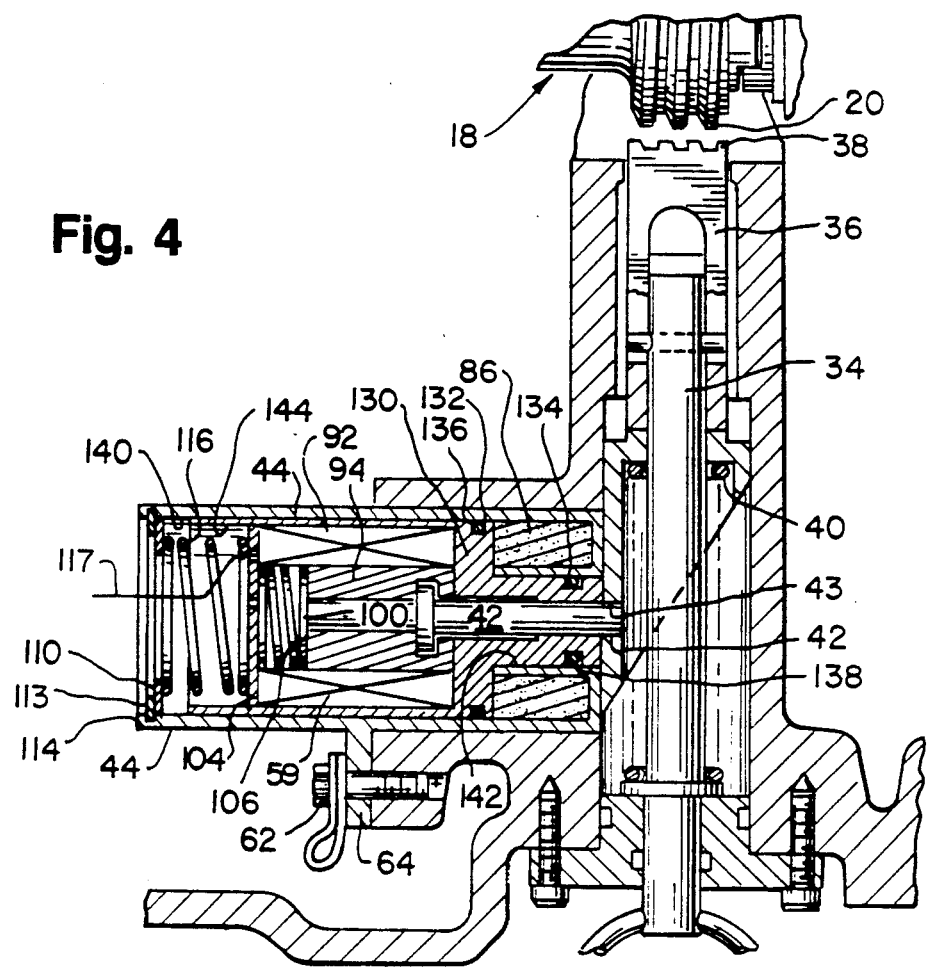
FIGS. 4, 6, 9, 11 and 13 are views similar to FIG. 2 illustrating alternative embodiments of the present invention before thermal activation thereof.
Figure 5:
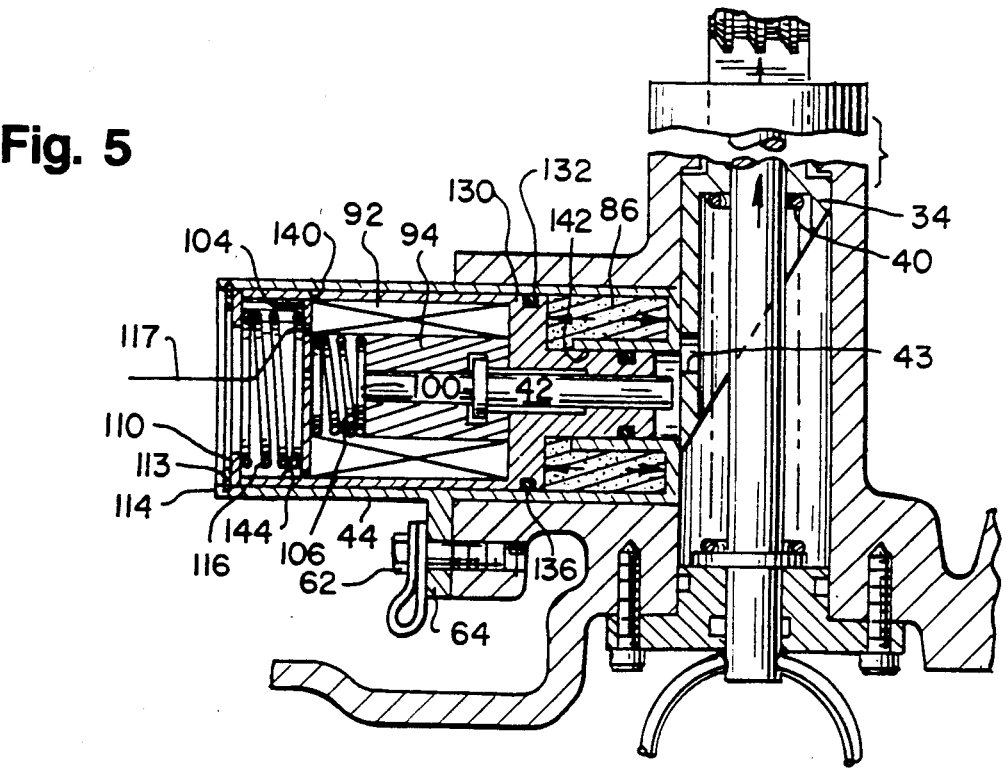
FIGS. 5, 8, 10, 12 and 14 are views similar to FIG. 3 illustrating the alternative embodiments of the present invention after thermal activation thereof.

FIGS. 4 and 5 illustrate an alternative embodiment wherein elements common to FIGS. 2 and 3 are assigned like reference numerals. Only the differences between the embodiments of FIGS. and 3 and FIGS. 4 and 5 will be discussed in detail herein, it being understood that the remaining elements are generally identical.

The embodiment of FIGS. 4 and 5 differs from that illustrated in FIGS. 2 and 3 primarily in the design of the piston. More particularly, the piston 68 is replaced by a piston 130 having first and second recesses 132, 134 that receive annular seals 136, 138 therein, respectively. The seal 136 bears against an inner wall of a housing 140, similar to the seal 74 of the embodiment of FIGS. 2 and 3. However, the seal 138 seals against a radially inwardly directed wall 142 of the housing 140. In addition, a counterbore 144 of the piston 130 extends farther to the left as viewed in FIGS. 4 and 5 and the base plate 104 is mounted within the counterbore 144 and is thus carried by the piston 130.

Operation of the embodiment of FIGS. 4 and 5 is generally identical to that of FIGS. 2 and 3. When the wax 86 expands upon melting, the piston 130 is forced to the left until it assumes the position shown in FIG. 5 such that the solenoid plunger 42 is retracted from the hole 43 in the disconnect plunger 34. Disconnection of the worm shaft 18 from the shaft 10 thereafter results, as described previously.

Figure 6:
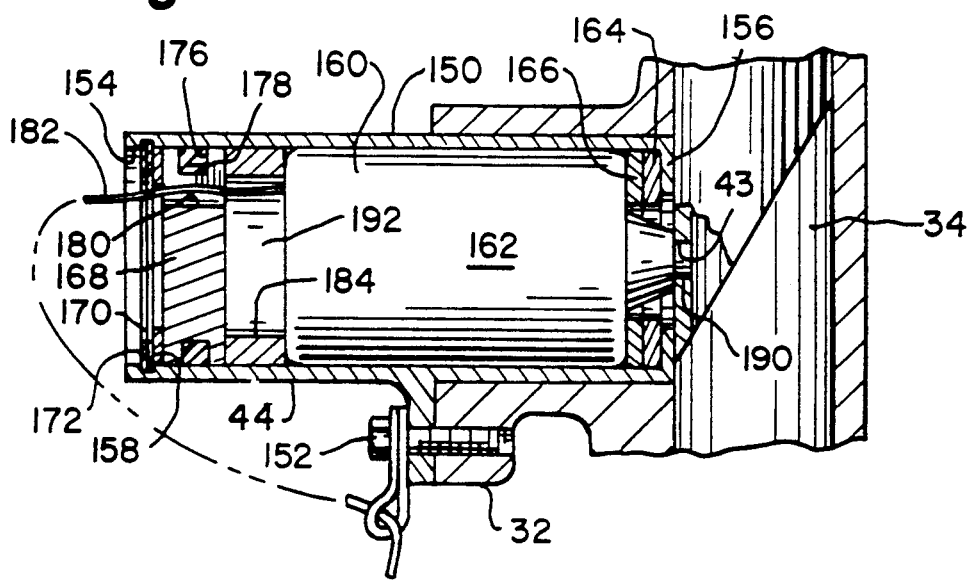
Figure 8:
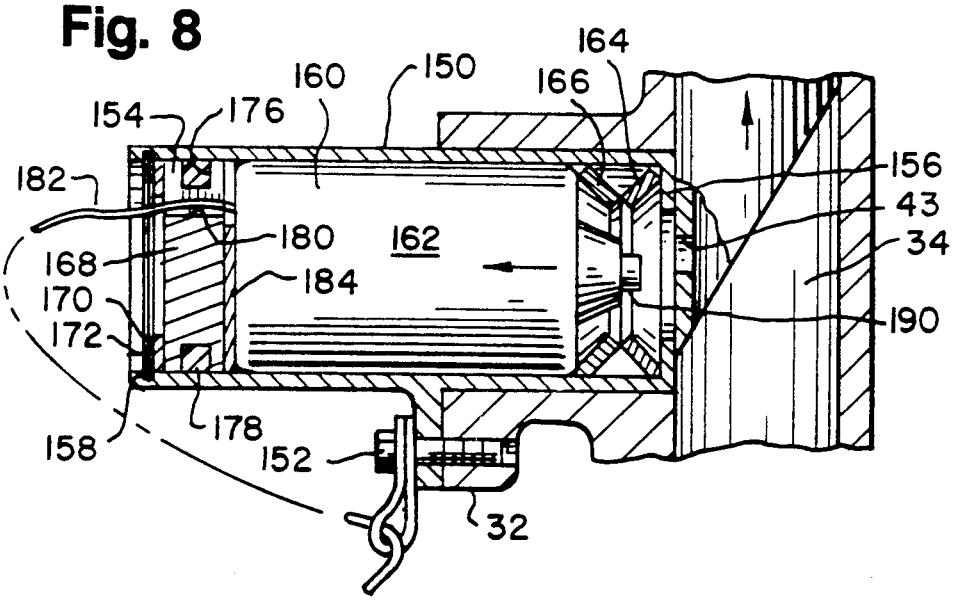
Figure 7:
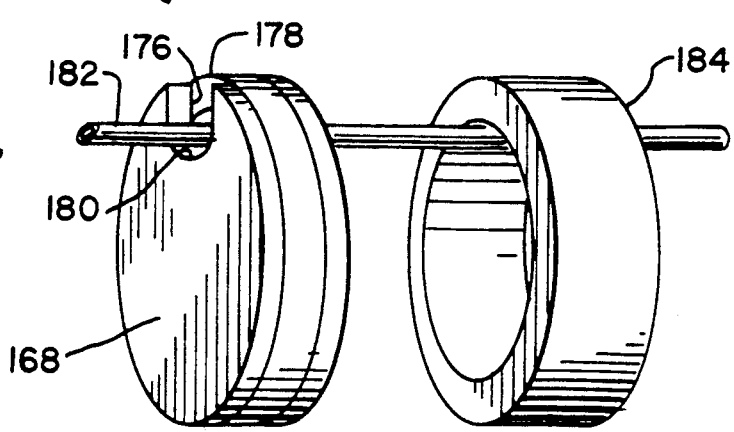
FIG. 7 comprises an exploded perspective view of a portion of the embodiment of FIGS. 6 and 8.

Referring now to FIGS. 6-8, a further embodiment of the present invention is illustrated. In this embodiment, a sleeve 150 is secured by bolts 152 to the housing 32. The sleeve 150 is generally cylindrical in shape and includes an inner surface 154, a flange 156 at one end thereof and a circumferential groove 158 at a second opposite end thereof. A solenoid 160 is disposed within the sleeve 150 and includes an outer surface 162 which is generally the same shape but slightly smaller than the inner surface 154 of the sleeve 150 so that the solenoid 160 may slide axially within the sleeve 150 but be restrained against significant movement in the radial direction. Disposed between the flange 156 and the solenoid 162 are two or more belleville washers 164, 166. A retainer plate 168 is disposed adjacent a shim 170 and a snap ring 172 which is disposed in the circumferential groove 158. The retainer plate 168 includes an annular recess 176 which receives a sealing O-ring 178 therein. The retainer plate 168 includes a hole or aperture 180 through which solenoid wires 182 extend. If necessary or desirable, shrink tubing may be placed over the solenoid wires 182.

A ring of eutectic solder 184 is disposed between the solenoid 162 and the retainer plate 168. The widths of the solder ring 184 and the shim 170 are selected such that the belleville washers 164, 166 are compressed between the flange 156 and the solenoid 160 when the temperature of the solder ring 184 is below its melting point. When the melting point of the solder ring 184 is reached, the parts assume the positions shown in FIG. 8 whereby the belleville washers 164, 166 force the solenoid 162 toward the retainer plate 168, thereby pulling a solenoid plunger 190 out of engagement with the hole 43 of the solenoid plunger 34 to in turn cause disconnection of the shaft 18 from the shaft 10, as previously described.

The volume of the recess 192 between the solenoid 160 and the retainer plate 168 before melting of the eutectic solder ring 184 is selected such that the level of melted solder does not rise to the hole or aperture 180 in the retainer plate 68 after melting of the solder ring 184. If necessary or desirable, one or more seals may be used to seal the wire to prevent escape of solder. Thus, the solder does not escape to contaminate other parts in the vicinity of the disconnect device 44.

Figure 9:
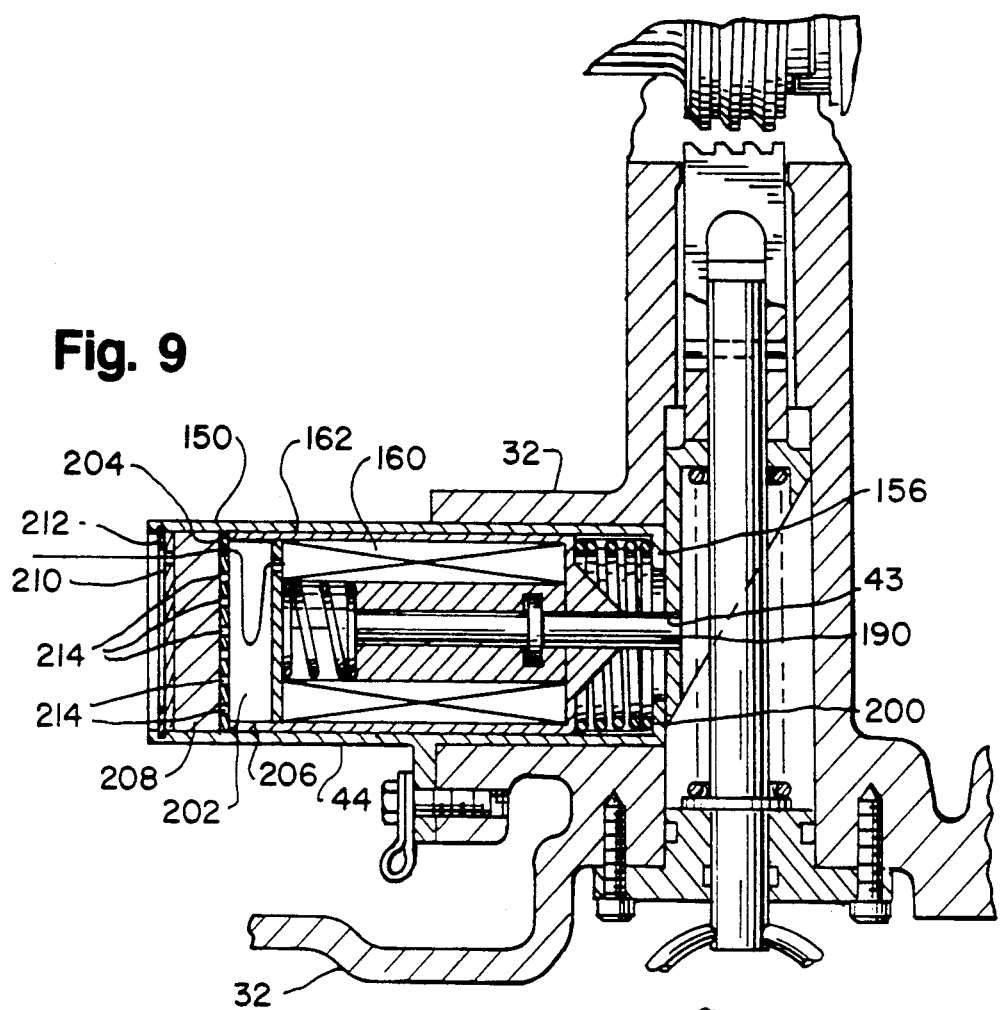
Figure 10:
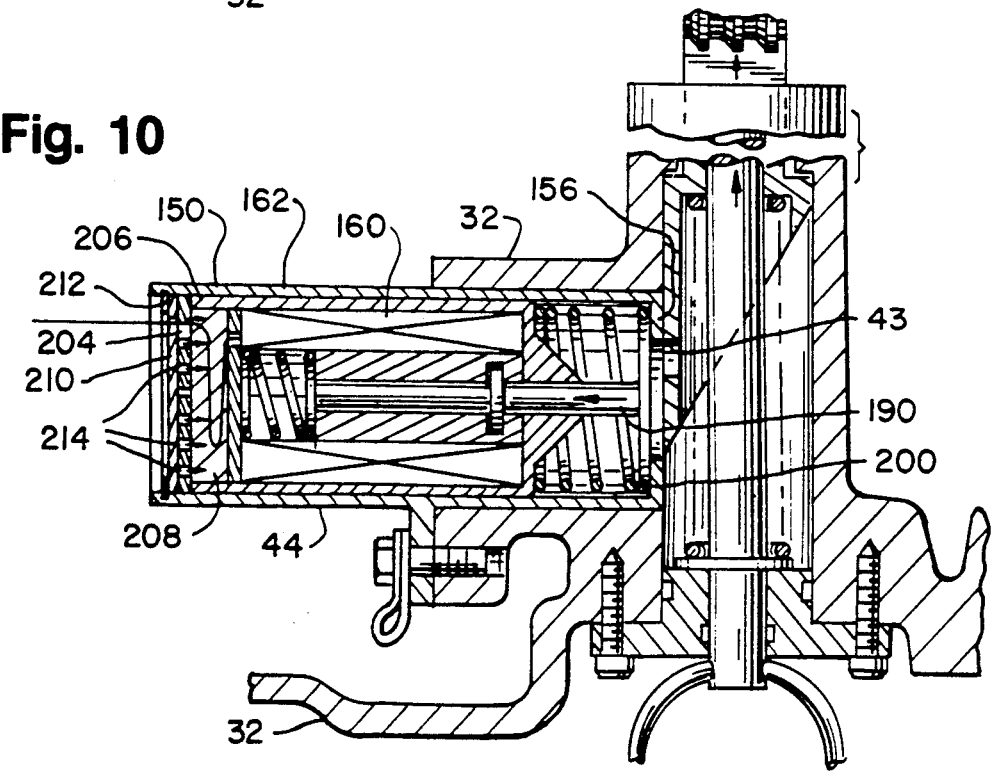

FIGS. 9 and 10 illustrate a further embodiment of the present invention. Elements common between this embodiment and that illustrated in FIGS. 6-8 are identified by like reference numerals. In this embodiment, the solenoid 160 is disposed within the sleeve 150, as before. However, the belleville washers 164, 166 are replaced by a helical spring 200 which is disposed between the flange 156 and the solenoid 160. An air cavity 202 is formed between the solenoid 160 and a perforated plate 204. Preferably, the air cavity 202 is formed by a rearwardly extending cylindrical portion 206 of the housing defining the outer surface 162 of the solenoid 160. Alternatively, the air cavity 202 is formed by a cylindrical ring separate from the housing defining the outer surface 162 of the solenoid 160, if desired. In either case, the force developed by the spring 200 is transmitted by the solenoid 160 and the portion 206 against the perforated plate 204 and a mass of eutectic material in the form of a slug of solder 208. The solder 208 is captured between the perforated plate 204 and an end plate 210 which is in turn maintained in place by a snap-ring 212. similar to the snap-ring 172 described previously.

The solenoid wires 182 pass through holes in the perforated plate 204, the solder 208 and the end plate 210. The wires 182 may be epoxied as they pass through the end plate 210 or may be sealed by a tight-fitting grommet or other seal to prevent escape of solder.

When the temperature of the solder 208 is below its melting point, the various elements are in the position illustrated in FIG. 9. However, when the solder 208 melts, the liquified solder flows through holes 214 in the perforated plate 204, thereby allowing the plate 214 to move toward the end plate 210. The solenoid 160, and hence the solenoid plunger 190, is thereby retracted away from the hole 43, as described previously.

Figure 11:
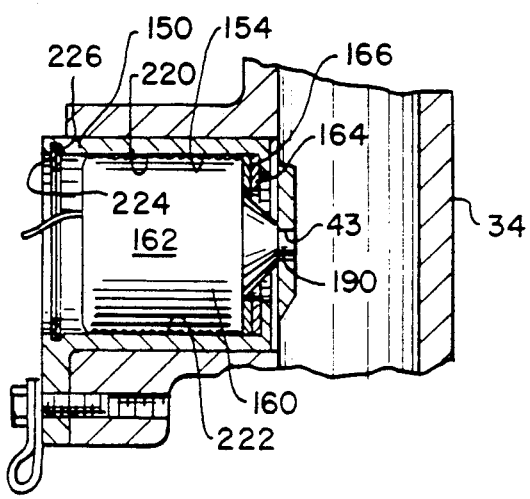
Figure 12:
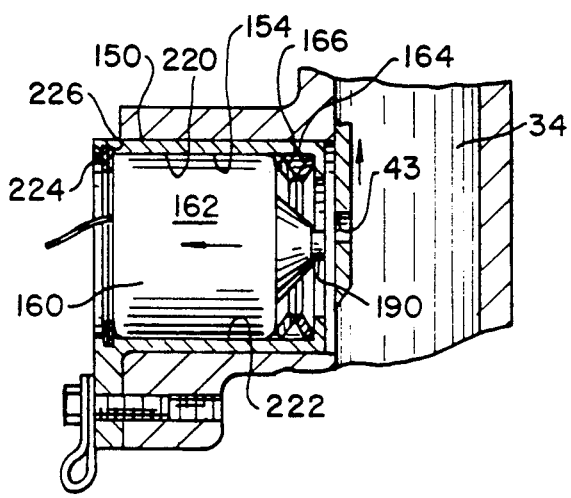

FIGS. 11 and 12 illustrate a still further modification to the embodiment of FIGS. 6-8. In this case, an annular space 220 between the inner surface 154 of the sleeve 150 and the outer surface 162 of the solenoid 160 is filled with eutectic solder 222 which is allowed to harden when the solenoid 160 is in the position shown in FIG. 11, i.e. when the belleville washers 164, 166 are compressed. The shear strength of the eutectic solder, when in its solid state, is greater than the spring force exerted by the belleville washers 164, 166 when compressed. However, when the melting point of the eutectic solder 222 is reached, the shear strength of the solder is overcome by the force applied by the belleville washers 164, 166 and the solenoid body 160 is moved to the left so that it assumes the position shown in FIG. 12. A retaining ring 224 which is retained within a circumferential slot 226 in the sleeve 150 prevents escape of the solenoid 160 out of the sleeve 150. As before, the solenoid plunger is retracted out of the hole 43 so that the shafts 10 and 18 are disconnected from one another.

Figure 13:
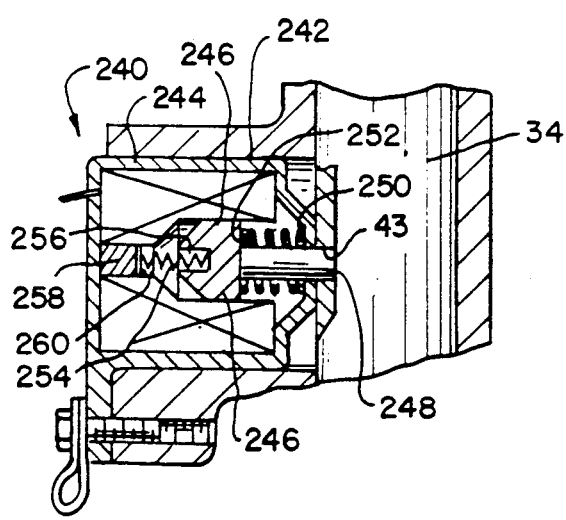
Figure 14:
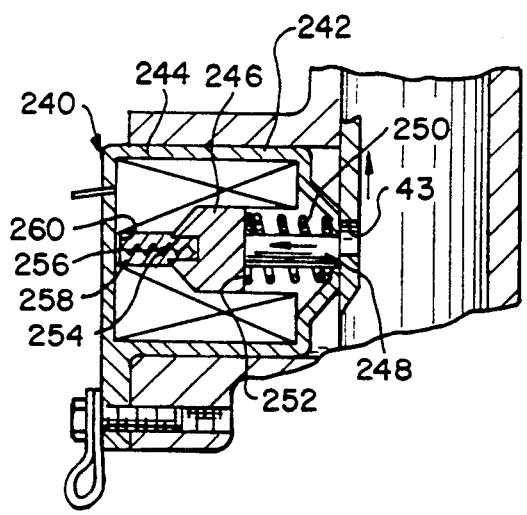

FIGS. 13 and 14 illustrate yet another embodiment of the present invention.

In this embodiment, a solenoid 240 includes a housing 242 within which is disposed a set of windings 244, an armature 246 and a solenoid plunger 248, similar to the previous embodiments. However, a first spring 250 is disposed between the housing 242 and a shoulder 252 of the armature 246. A second spring 254 extends between a counterbore 256 in the armature 246 and a mass of eutectic material in the form of a slug of solder 258 is disposed within a channel 260. When the solder 258 is in its solid state, the relative forces exerted by the springs 250, 254 are balanced such that the solenoid plunger 248 extends into the hole 43 in the plunger 34. However, when the temperature of the solder 258 exceeds its melting point, support for the spring 254 is lost, thereby causing the spring 250 to move the armature 246, and hence the solenoid plunger 248, to the left as viewed in the Figures so that the various parts assume the positions shown in FIG. 14. The solenoid plunger 248 is thereby withdrawn from the hole 43 to allow the plunger 34 to move into contact with the worm shaft 18, as described previously.

In each of the foregoing embodiments, a eutectic material acts against the force of the spring to achieve a thermal disconnect. The disconnect function occurs as a result of a change of state of the eutectic material. If necessary or desirable, a shear pin may be utilized between relatively movable parts, for example between the piston 68 and the housing 60 of FIGS. 2 and 3 to allow limited thermal expansion and/or contraction of eutectic material without actuation of the thermal disconnect function until the phase change takes place.

The disconnect devise of the present invention is simple in design, extremely reliable and, in some embodiments, allows resetting after the cause of the fault has been pinpointed and corrected.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A device for moving a first shaft relative to a second shaft between an engaged position wherein cooperating structures carried by the first and second shafts are engaged so that the shafts rotate together and a disengaged position wherein the cooperating structures carried by the first and second shafts are disengaged from one another, comprising:
   - a disconnect plunger having an engaging member engageable with a first portion of the first shaft;
   - first means for urging the disconnect plunger toward the first shaft whereby the engaging member engages the first portion of the first shaft and causes the first shaft to move the disengaged position;
   - a solenoid having an armature and windings;
   - a solenoid plunger coupled to the solenoid armature;
   - second means for urging the solenoid plunger into engagement with the disconnect plunger to thereby prevent movement of the disconnect plunger into engagement with the first shaft;
   - third means for controllably energizing the solenoid windings to move the solenoid armature such that the solenoid plunger is retracted from the disconnect plunger; and
   - an expandable material disposed in a confined volume of space between the disconnect plunger and the solenoid whereby the expandable material expands when heated to a certain temperature to in turn move the solenoid plunger, the solenoid armature and solenoid winding away from the disconnect plunger and thereby cause the disconnect plunger to contact the first shaft under the influence of the first urging means.

2. The device of claim 1, wherein the expandable material comprises a eutectic wax.

3. The device of claim 1, wherein the first and second urging means comprise first and second springs, respectively.

4. The device of claim 3, further including a cylindrical housing within which the solenoid, the second spring and the expandable material are disposed, a base plate disposed in the housing adjacent an end of the solenoid windings and a stop member disposed in the housing and spaced from the base plate wherein a recess is formed between the base plate and the stop member and wherein the second spring is disposed in the recess.

5. The device of claim 4, further including a third spring disposed in a further recess within the housing between the base plate and the solenoid armature.

6. The device of claim 4, further including a piston disposed within the housing between the expandable material and the solenoid wherein the piston transmits forces developed during expansion of the expandable material to the solenoid armature and solenoid windings.

7. A device for moving a first shaft relative to a second shaft between an engaged position wherein cooperating structures carried by the first and second shafts are engaged so that the shafts rotate together and a disengaged position wherein the cooperating structures carried by the first and second shafts are disengaged from one another, comprising:
- a disconnect plunger having an engaging member engageable with a first portion of the first shaft;
- first means for urging the disconnect plunger toward the first shaft whereby the engaging member engages the first portion of the first shaft and causes the first shaft to move to the disengaged position;
- a solenoid having a housing and a solenoid plunger extending outwardly from the housing, the solenoid capable of assuming two states in which the solenoid plunger is disposed in different positions relative to the housing;
- second means in contact with the solenoid housing for urging the solenoid plunger away from the disconnect plunger; and
- third means effective at temperatures lower than a certain temperature for resisting the urging of the second means so that the solenoid plunger contacts the disconnect plunger when the solenoid assumes one of the states to thereby prevent movement of the disconnect plunger into engagement with the first shaft and effective at temperatures higher than the certain temperature to allow the solenoid plunger to move under the influence of the second urging means out of contact with the disconnect plunger whereby the disconnect plunger moves into engagement with the first shaft under the influence of the first urging means.

8. The device of claim 7, wherein the solenoid is disposed in a sleeve adjacent one end thereof and the third means comprises a mass of eutectic solder disposed in a recess of the sleeve adjacent a second end thereof opposite the first end.

9. The device of claim 8, wherein the mass of eutectic solder is ring-shaped.

10. The device of claim 8, wherein the recess is defined by the housing, the solenoid and a retainer plate disposed adjacent the second end of the housing and wherein the retainer plate prevents escape of solder from the recess.

11. The device of claim 10, further including a retaining ring disposed between the second end of the sleeve and the retainer plate to maintain the retainer plate in position.

12. The device of claim 8, wherein the second means is disposed between a flange at the first end of the housing and the solenoid.

13. The device of claim 12, wherein the second means comprises a belleville washer.

14. The device of claim 8, wherein the solenoid is disposed within a cylindrical sleeve such that an annular space is formed between the solenoid and the sleeve and wherein the third means comprises eutectic solder disposed in the annular space.

15. The device of claim 14, wherein the second means is disposed between a flange at the first end of the housing and the solenoid.

16. The device of claim 15, wherein the second means comprises a belleville washer.

17. The device of claim 14, further including a retaining ring disposed in the sleeve between the solenoid and the second end of the sleeve for retaining the solenoid in the sleeve.

18. The device of claim 7, wherein the second means comprises a first spring disposed within the housing between the solenoid plunger and a first end of the housing adjacent the disconnect plunger and wherein the third means comprises a mass of eutectic solder disposed in the housing at a second end thereof opposite the first end and a second spring disposed in the housing between the mass of eutectic solder and the plunger.

19. A device for moving a first shaft relative to a second shaft between an engaged position wherein cooperating structures carried by the first and second shafts are engaged so that the shafts rotate together and a disengaged position wherein the cooperating structures carried by the first and second shafts are disengaged from one another, comprising:
- a disconnect plunger having an engaging member engageable with a first portion of the first shaft;
- first means for urging the disconnect plunger toward the first shaft whereby the engaging member engages the first portion of the first shaft and causes the first shaft to move to the disengaged position;
- a solenoid having a housing, an armature and windings disposed in the housing and a solenoid plunger coupled to the armature, the solenoid being operable in either of deenergized and energized states in which the solenoid plunger is disposed in first and second positions relative to the housing, respectively;
- a second spring disposed in the housing on a first side of the armature for urging the solenoid plunger away from the disconnect plunger;
- a third spring disposed in the housing on a second side of the armature; and
- thermally responsive means effective at temperatures lower than a certain temperature for supporting the third spring such that the third spring resists the urging of the second spring whereby the solenoid plunger extends out of the housing into engagement with the disconnect plunger to prevent the disconnect plunger from contacting the first shaft and effective at temperatures higher than the certain temperature for removing the support of the third spring whereby the solenoid plunger moves under the influence of the second springs out of contact with the disconnect plunger such that the disconnect plunger moves into engagement with the first shaft under the influence of the first spring.

20. The device of claim 19, wherein the thermally responsive means comprises a mass of eutectic solder disposed between the third spring and a wall of the solenoid housing.

* * * * *